US009457850B2

(12) United States Patent
Van Mill (10) Patent No.: US 9,457,850 B2
(45) Date of Patent: Oct. 4, 2016

(54) DUAL TRACK

(71) Applicant: Unverferth Manufacturing Company, Inc., Kalida, OH (US)

(72) Inventor: Michael D. Van Mill, Shell Rock, IA (US)

(73) Assignee: Unverferth Manufacturing Co., Inc., Kalida, OH (US)

( * ) Notice: Subject to any disclaimer, the term of this patent is extended or adjusted under 35 U.S.C. 154(b) by 0 days.

(21) Appl. No.: 14/306,007

(22) Filed: Jun. 16, 2014

(65) Prior Publication Data

US 2014/0367181 A1  Dec. 18, 2014

Related U.S. Application Data

(60) Provisional application No. 61/835,111, filed on Jun. 14, 2013.

(51) Int. Cl.
| | |
|---|---|
| *B62D 55/065* | (2006.01) |
| *B62D 55/08* | (2006.01) |
| *B62D 55/084* | (2006.01) |
| *B62D 55/10* | (2006.01) |

(52) U.S. Cl.
CPC ............ *B62D 55/065* (2013.01); *B62D 55/08* (2013.01); *B62D 55/084* (2013.01); *B62D 55/10* (2013.01)

(58) Field of Classification Search
CPC .... B62D 55/08; B62D 55/084; B62D 55/10; B62D 55/065
See application file for complete search history.

(56) References Cited

U.S. PATENT DOCUMENTS

| | | | | |
|---|---|---|---|---|
| 1,518,465 | A | * | 12/1924 | Sternberg ...................... 305/100 |
| 4,166,511 | A | * | 9/1979 | Stedman ........................ 180/9.5 |
| 5,899,543 | A | | 5/1999 | Lykken et al. |
| 6,712,549 | B2 | | 3/2004 | Roth |
| 7,380,892 | B2 | | 6/2008 | Rosenboom |

(Continued)

OTHER PUBLICATIONS

Exactrix Yielder 60120, 1 page.

(Continued)

*Primary Examiner* — Joseph Rocca
*Assistant Examiner* — Maurice Williams
(74) *Attorney, Agent, or Firm* — Rothwell, Figg, Ernst & Manbeck, P.C.

(57) ABSTRACT

A farm implement includes an undercarriage including at least a front crossbeam and a rear crossbeam and first and second dual track propulsion systems. Each dual track propulsion system includes a first track assembly and a second track assembly. Each track assembly includes at least a track frame, at least two wheels and a track belt looped around the wheels. Each track assembly also includes a track support beam coupled to the track frames of the first and second track assemblies. The track support beam is pivotably coupled to the front and rear crossbeams such that said track support beam can pivot about a first axis of rotation parallel to a longitudinal axis of the track support beam, thereby allowing the first track assembly to move generally upwardly and downwardly in the opposite direction of the second track assembly. The first track assembly is pivotably coupled to the track support beam such that the first track assembly is pivotable about a second axis of rotation approximately perpendicular to the first axis of rotation and the second track assembly is pivotably coupled to the track support beam such that the second track assembly is pivotable about third axis of rotation approximately perpendicular to the first axis of rotation.

18 Claims, 6 Drawing Sheets

(56) References Cited

U.S. PATENT DOCUMENTS

| | | | |
|---|---|---|---|
| 7,726,749 B2 | 6/2010 | Rosenboom | |
| 7,740,084 B2 | 6/2010 | Rosenboom | |
| 8,342,257 B2 | 1/2013 | Rosenboom | |
| 8,528,657 B1 | 9/2013 | Rosenboom | |
| 8,763,716 B2 | 7/2014 | Rosenboom | |
| 8,875,815 B2 * | 11/2014 | Terrien et al. | 180/9.3 |
| 2002/0023788 A1 * | 2/2002 | Torrie et al. | 180/9.26 |
| 2007/0194540 A1 * | 8/2007 | Caspi et al. | 280/5.22 |
| 2010/0263948 A1 * | 10/2010 | Couture et al. | 180/8.2 |
| 2012/0073843 A1 * | 3/2012 | Kure | 172/407 |
| 2013/0181431 A1 * | 7/2013 | McMahon et al. | 280/839 |
| 2014/0262563 A1 | 9/2014 | Rosenboom | |

OTHER PUBLICATIONS

Balzer Grain Cart, brochure, 8 pages.

Balzer Inc. "Standard Model Specifications", Slimy Tank and more, 2 pages.

AG Spray Equipment brochure, 2 pages.

* cited by examiner

DUAL TRACK

CROSS-REFERENCE TO RELATED APPLICATIONS

This application claims the benefit of U.S. Provisional Patent Application Ser. No. 61/835,111, filed on Jun. 14, 2013, the contents of which are incorporated herein in their entirety.

BACKGROUND OF THE INVENTION

1. Field of the Invention

The present invention is directed to a dual track for a farm implement, and, more particularly, to two sets of paired tracks, each set being pivotable relative to a shared pivot axis. Each set of tracks is coupled to a support beam which is pivotable about a pivot axis approximately orthogonal to the shared track pivot axis.

2. Description of the Related Art

Mobile farm implements may generally include wheels or a track assembly to support the frame and allow a towing implement to move the farm implement. The farm implements are used in fields in which the terrain may be uneven. If the track assembly is not able to follow the contours of the terrain, it may cause stress on assembly, which may cause failure or increased wear. The farm implements are also required to closely follow the path of a towing vehicle to avoid moving off the path and damaging crops. Therefore, it is desirable to have a track assembly for a farm implement that can adapt to the unevenness of the terrain and closely follow path of the towing vehicle.

SUMMARY OF THE INVENTION

According to a first embodiment of the present invention, a track system for a farm implement including an undercarriage including at least a front crossbeam and a rear crossbeam comprises first and second dual track propulsion systems. Each dual track propulsion system comprises a first track assembly and a second track assembly. Each track assembly includes at least a track frame, at least two wheels and a track belt positioned over said wheels. Each track assembly also includes a track support beam coupled to the track frame of the first track assembly and the track frame of the second track assembly. The track support beam includes a first end and a second end, and the first end is pivotably coupled to the front crossbeam and the second end is pivotably coupled to the rear crossbeam such that said track support beam pivots about a first axis of rotation and causes the first track assembly to move in the opposite direction of the second track assembly. The first track assembly is pivotably coupled to the track support beam such that the first track assembly is pivotable about a second axis of rotation approximately perpendicular to the first axis of rotation and the second track assembly is pivotably coupled to the track support beam such that the second track assembly is pivotable about third axis of rotation approximately perpendicular to the first axis of rotation.

According to another embodiment of the present invention, the first track assembly includes a first track pivot coupling and the first track assembly is pivotably coupled to the track support beam via the first track pivot coupling such that it is pivotable about the second axis of rotation. The second track assembly includes a second track coupling and the second track assembly is pivotably coupled to the track support beam via the second track pivot coupling such that it is pivotable about the third axis of rotation.

According to further embodiment of the present invention, the first track assembly includes a first track pivot opening and the track support beam includes a track pivot arm that engages the first track pivot opening such that the first track assembly is pivotable about the second axis of rotation. The second track assembly includes a second track pivot opening and the track pivot arm engages the second track pivot opening such that the second track assembly is pivotable about the third axis of rotation.

According to another embodiment of the present invention, the track support beam of the first dual track propulsion system pivots independently of the track support beam of the second dual track propulsion system.

According to a further embodiment of the present invention, the first track assembly pivots about the second pivot axis and the second track assembly pivoting about the third pivot axis independent of each other.

According to another embodiment of the present invention, at least one of the first track assembly and the second track assembly is positioned between the front crossbeam and the rear crossbeam.

According to a further embodiment of the present invention, the track support beam is positioned between the first track assembly and the second track assembly.

According to another embodiment of the present invention, a farm implement includes an undercarriage including at least a front crossbeam and a rear crossbeam and first and second dual track propulsion systems. Each dual track propulsion system includes a first track assembly and a second track assembly. Each track assembly includes at least a track frame, at least two wheels and a track belt looped around the wheels. Each track assembly also includes a track support beam coupled to the track frames of the first and second track assemblies. The track support beam is pivotably coupled to the front and rear crossbeams such that said track support beam can pivot about a first axis of rotation parallel to a longitudinal axis of the track support beam, thereby allowing the first track assembly to move generally upwardly and downwardly in the opposite direction of the second track assembly. The first track assembly is pivotably coupled to the track support beam such that the first track assembly is pivotable about a second axis of rotation approximately perpendicular to the first axis of rotation and the second track assembly is pivotably coupled to the track support beam such that the second track assembly is pivotable about third axis of rotation approximately perpendicular to the first axis of rotation.

DETAILED DESCRIPTION

While the present invention may be embodied in many different forms, a number of illustrative embodiments are described herein with the understanding that the present disclosure is to be considered as providing examples and not intended to limit the invention to the preferred embodiments described and/or illustrated herein.

An embodiment of a farm implement 10 with a multiple track propulsion system 12 according to the present invention is shown in FIGS. 1-6. In the embodiment shown, the farm implement 10 is a grain cart with a storage bin 14 mounted on a frame or undercarriage 16 and a grain conveyor 18 configured to receive grain from the storage bin and dispense the grain from a discharge spout 20. A tow hitch 22 extending forwardly from the undercarriage 16 allows the grain cart to be towed behind a tractor or the like. In the embodiment shown, the multiple track propulsion system 12 of the present invention is coupled to the undercarriage 16 of the grain cart. While the farm implement 10 is shown as a grain cart, it will be appreciated that the multiple track propulsion system of the present invention can be used on other types of towable farm implements, such as seed tenders and fertilizer applicators, as well as self-powered farm implements, such as combines, and other types of vehicles intended to travel over soft ground.

In the embodiment shown, the multiple track propulsion system 12 includes two pairs of track assemblies 24. One pair of track assemblies is disposed on a right side of the farm implement and the other pair of track assemblies is disposed on a left side of the farm implement. Each track assembly 24 includes a pair of longitudinally spaced wheels 26 mounted for rotation on a track frame 28 and a continuous track or drive belt 30 looping around the wheels. In the case of a towable implement as shown, each of the wheels 26 is an idler wheel. In alternative embodiments, one of the wheels may be a drive wheel.

Each pair of track assemblies 24 is mounted for pivoting movement on a shared track pivot axis 32. This track pivot axis 32 is defined by a track pivot 34 on a longitudinal track support or structure beam 36 running lengthwise between a respective track assembly pair. In an embodiment, longitudinal structure beam 36 is oriented parallel to a longitudinal axis of the farm implement 10 (i.e., lengthwise), and track pivot axis 32 is oriented perpendicular to longitudinal structure beam 36 (i.e., crosswise).

In the embodiment shown, the longitudinal structure beam 36 connects at opposite ends (i.e., at front and rear ends of the longitudinal structure beam) to cross beams 38 and 40 extending from the farm implement's undercarriage 16. In an embodiment, cross beams 38 and 40 extend crosswise (i.e., the cross beams 38 and 40 are oriented perpendicular to a longitudinal axis of the farm implement 10). In the embodiment shown, respective ends of longitudinal structure beam 36 are coupled with cross beams 38 and 40 at beam pivots 42, defining a longitudinal beam pivot axis 44 which allows the longitudinal structure beam (and the track assembly pair mounted thereon) to rotate/oscillate about the beam pivot axis, which is oriented perpendicular (i.e., at 90 degrees) relative to the track pivot axis 32.

In a preferred embodiment, the track assemblies 24 do not extend beyond the overall width of the storage bin to maintain transport width suitable for transporting the farm implement over the road. In an embodiment, the track pivot axis 32 is located between wheels 26, preferably at or near a center of the respective track frame 28.

Figure 1:
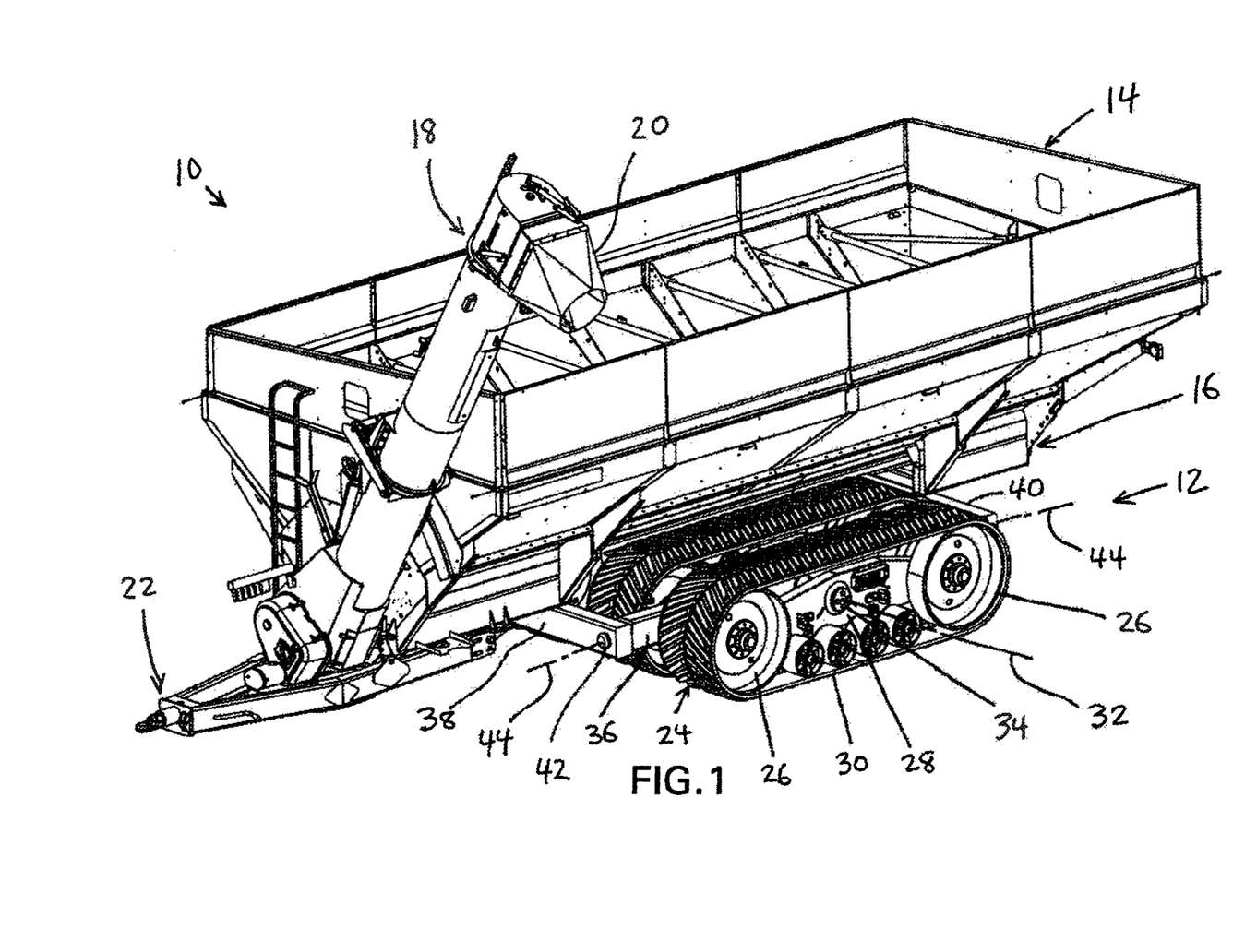
FIGS. 1 and 2 illustrate a perspective view of a farm implement including two sets of paired tracks according to an embodiment of the present invention.
Figure 2:
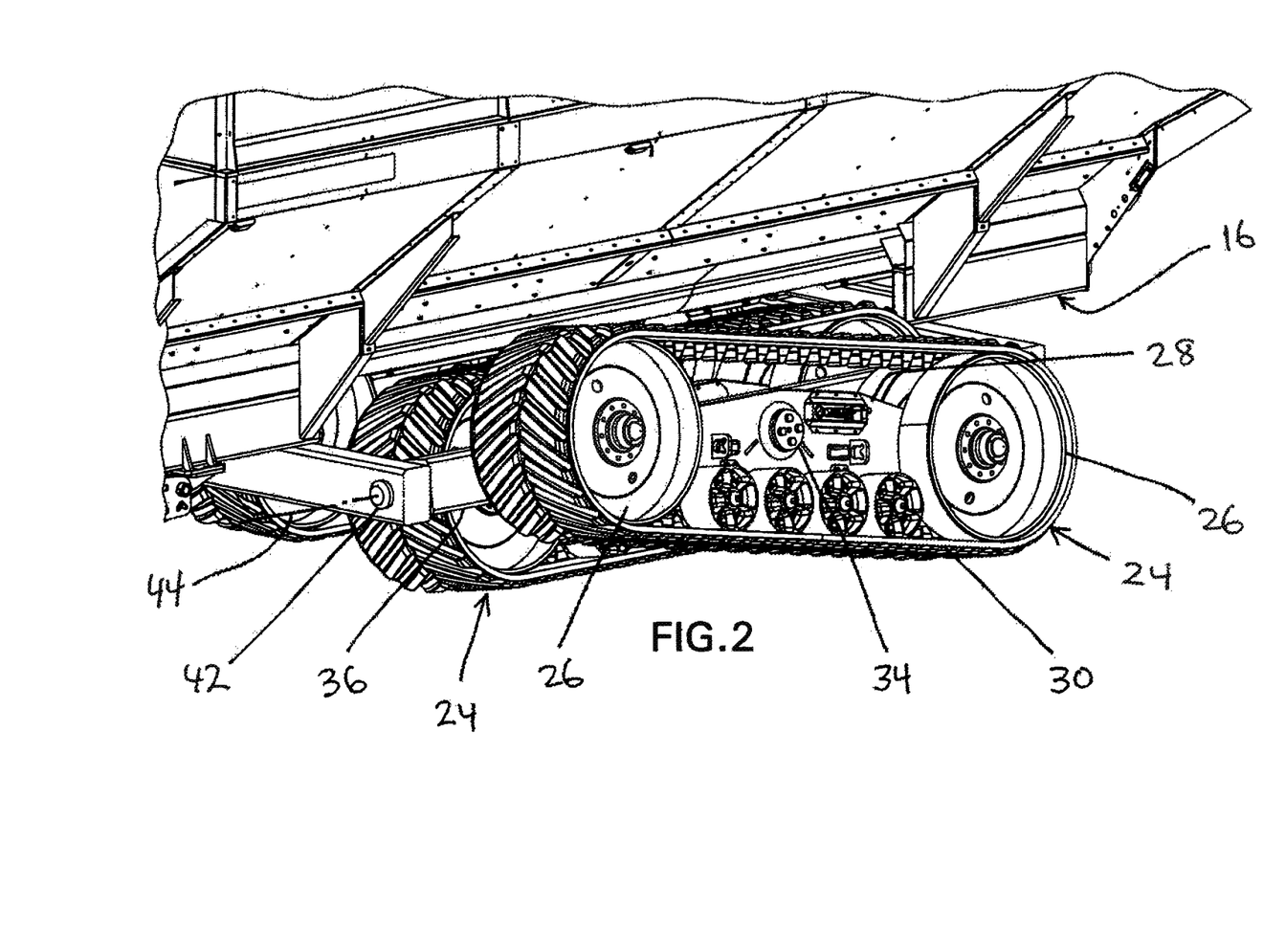
Figure 3:
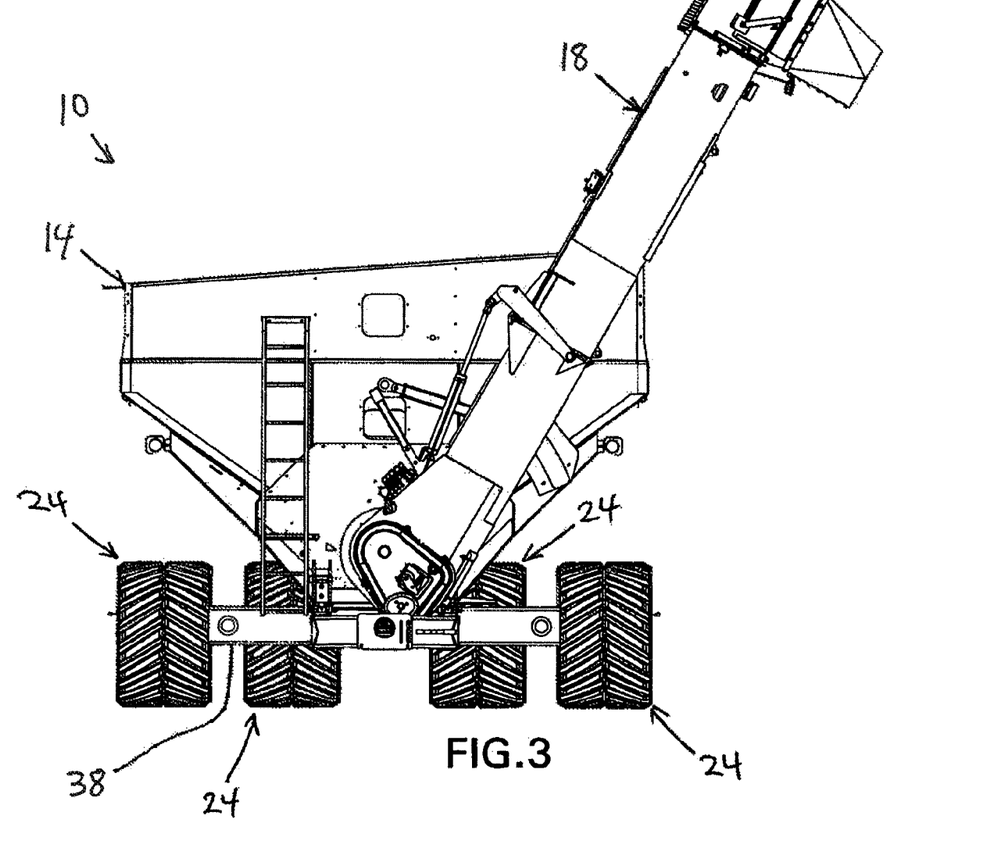
FIGS. 3 and 4 illustrate a front view of a farm implement including two sets of paired tracks according to an embodiment of the present invention.
Figure 4:
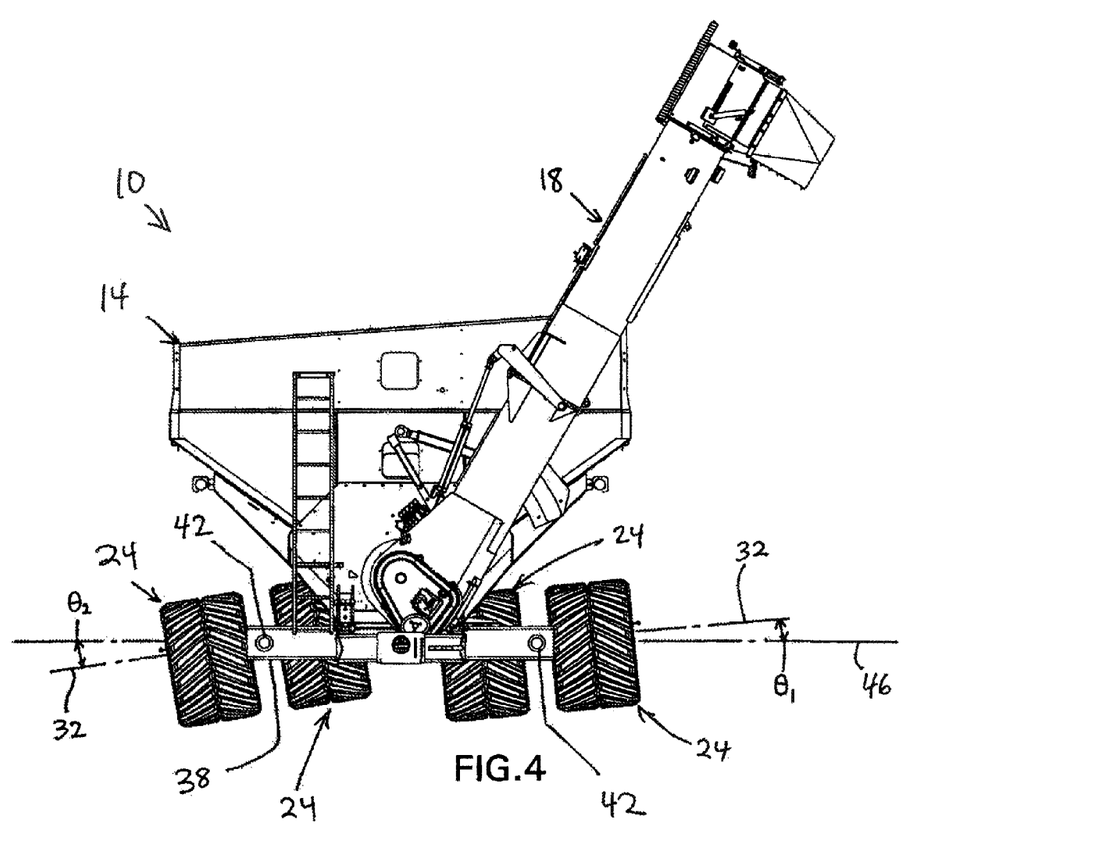
Figure 5:
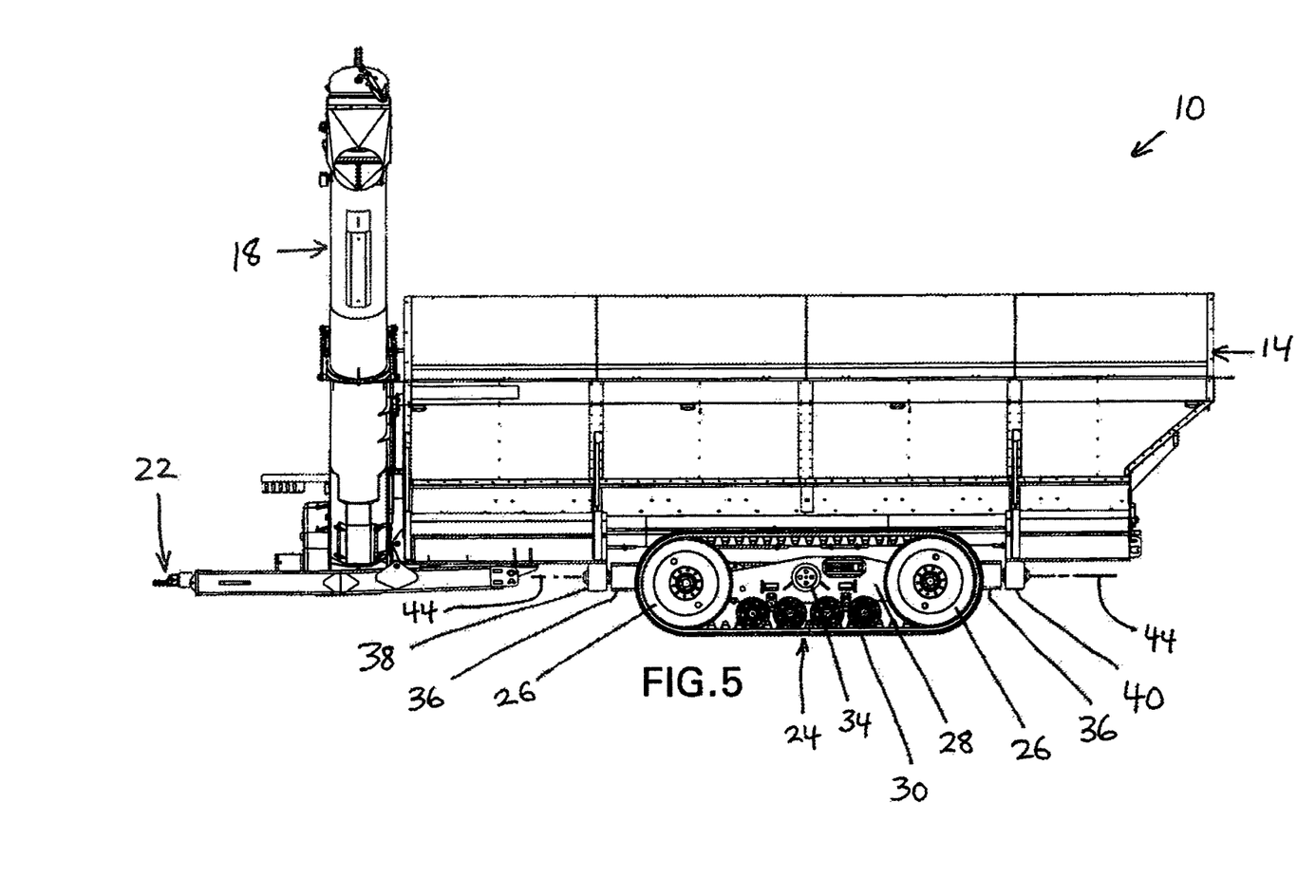
FIGS. 5 and 6 illustrate a side view of a farm implement including two sets of paired tracks according to an embodiment of the present invention.
Figure 6:
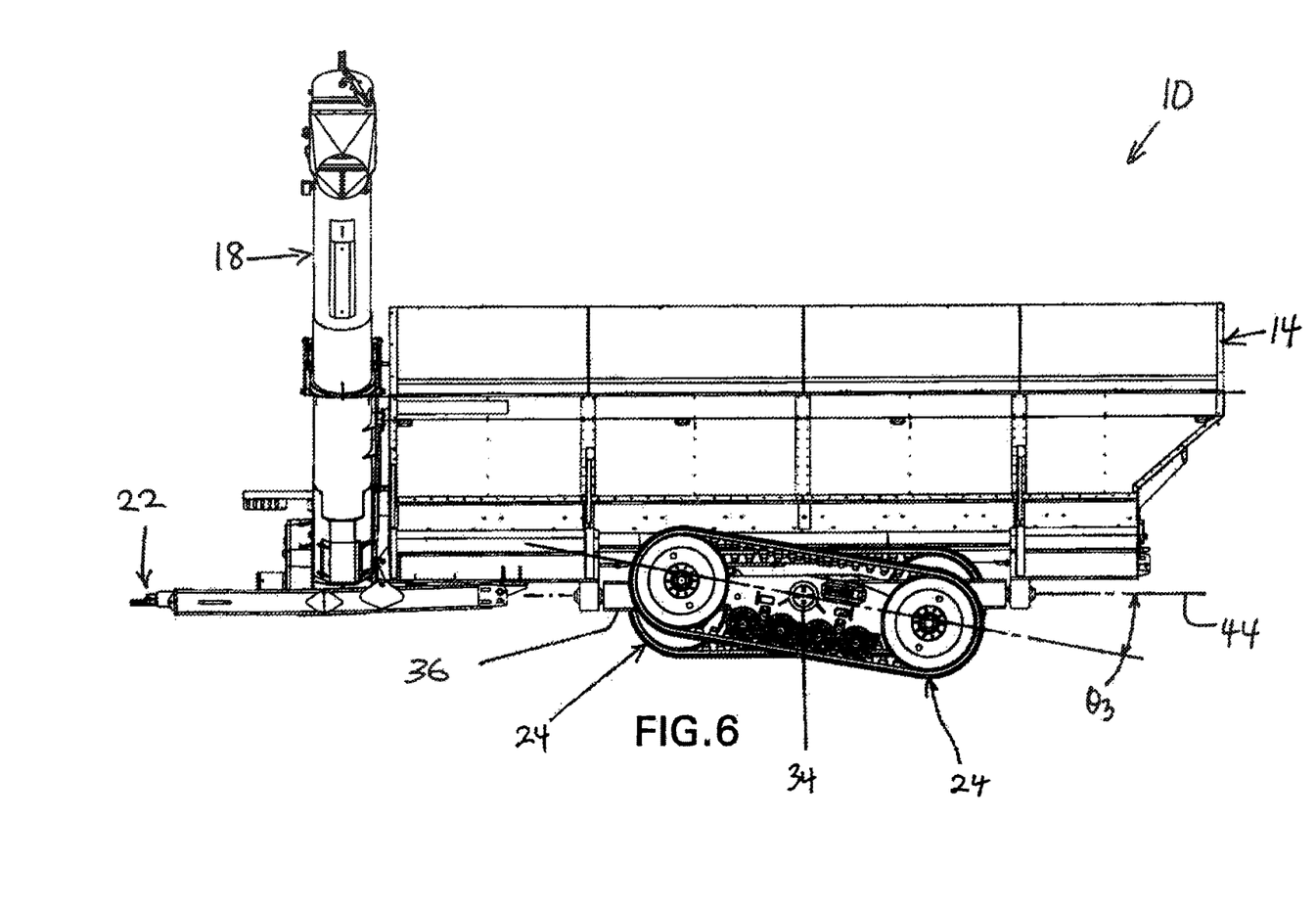

The combination of the track pivot and the beam pivot allows the track to follow extreme contours with shared loading between track assemblies. Each side's pair of track assemblies is preferably independent of the opposite side's pair of track assemblies. For example, as shown in the front view of the farm implement in FIG. 4, the track assemblies 24 on a first side of the implement can pivot to a first angle $\theta_1$ relative to plane 46 about the pivot axis defined by pivot 42 on the first side, and the track assemblies 24 on the second (opposite) side of the implement can pivot to a second angle $\theta_2$ relative to plane 42 about the pivot axis defined by pivot 42 on the second side, where plane 46 is defined by pivot axes 44 on opposite sides of the implement. The pivot angles $\theta_1$ and $\theta_2$ of the track assemblies on opposite sides of the implement can be the same or different, depending on ground contour. Similarly, as shown in the side view of the farm implement in FIG. 6, track assemblies 24 on the same side of the implement can pivot different amounts about their shared pivot axis defined by track pivot 34. In FIG. 6, the outer track assembly 24 is shown pivoting to an angle $\theta_3$ relative to the beam axis 44 while the inner track assembly remains parallel to the beam axis (i.e., $\theta=0$).

While an exemplary embodiment of the present invention has been shown and described, it will be appreciated that various modifications and improvements can be made without departing from the scope and spirit of the invention.

I claim:

1. A track system for a farm implement including an undercarriage including at least a front crossbeam and a rear crossbeam, comprising:
    first and second dual track propulsion systems, wherein the first and second dual track propulsion systems are located on opposite sides of the farm implement, each dual track propulsion system comprising:
    a first track assembly and a second track assembly, the first track assembly including at least a first track frame, at least two first wheels, and a first track belt looped around said first wheels, and the second track assembly including at least a second track frame, at least two second wheels, and a second track belt looped around said second wheels, wherein the first and second track assemblies are laterally spaced apart; and
    a track support beam coupled to the first track frame of the first track assembly and the second track frame of the second track assembly and including a first end and a second end, wherein the first end is pivotably coupled to the front crossbeam and the second end is pivotably coupled to the rear crossbeam such that said track support beam pivots about a first axis of rotation and causes the first track assembly to move in the opposite direction of the second track assembly,
    wherein the first track assembly is pivotably coupled to the track support beam such that the first track assembly is pivotable about a second axis of rotation perpendicular to the first axis of rotation and the second track assembly is pivotably coupled to the track support beam such that the second track assembly is pivotable about third axis of rotation perpendicular to the first axis of rotation.

2. The track system of claim 1, wherein the first track assembly includes a first track pivot coupling and the first track assembly is pivotably coupled to the track support beam via the first track pivot coupling such that it is pivotable about the second axis of rotation, and the second track assembly includes a second track pivot coupling and the second track assembly is pivotably coupled to the track support beam via the second track pivot coupling such that it is pivotable about the third axis of rotation.

3. The track assembly of claim 1, wherein the second axis or rotation and the third axis of rotation are the same.

4. The track assembly of claim 1, wherein the track support beam of the first dual track propulsion system pivots independently of the track support beam of the second dual track propulsion system.

5. The track assembly of claim 1, wherein the first track assembly pivots about the second pivot axis and the second track assembly pivots about the third pivot axis independent of each other.

6. The track assembly of claim 1, wherein the track support beam is positioned between the first track assembly and the second track assembly.

7. The track assembly of claim 1, wherein the second axis of rotation and the third axis of rotation are located between the track wheels.

8. The track assembly of claim 7, wherein the second axis of rotation and the third axis of rotation extend through a center of the first and second track frames.

9. A track system for a farm implement including an undercarriage including at least a front crossbeam and a rear crossbeam, comprising:
first and second dual track propulsion systems, each dual track propulsion system comprising:
a first track assembly and a second track assembly, each track assembly including at least a track frame, at least two wheels, and a track belt looped around said wheels; and
a track support beam coupled to the track frame of the first track assembly and the track frame of the second track assembly and including a first end and a second end, wherein the first end is pivotably coupled to the front crossbeam and the second end is pivotably coupled to the rear crossbeam such that said track support beam pivots about a first axis of rotation and causes the first track assembly to move in the opposite direction of the second track assembly,
wherein the first track assembly is pivotably coupled to the track support beam such that the first track assembly is pivotable about a second axis of rotation perpendicular to the first axis of rotation and the second track assembly is pivotably coupled to the track support beam such that the second track assembly is pivotable about third axis of rotation perpendicular to the first axis of rotation, and
wherein at least one of the first track assembly and the second track assembly is positioned between the front crossbeam and the rear crossbeam.

10. A farm implement comprising:
an undercarriage including a front crossbeam and a rear crossbeam,
first and second dual track propulsion systems, wherein the first and second dual track propulsion systems are located on opposite sides of the farm implement, each dual track propulsion system including:
a first track assembly and a second track assembly, the first track assembly including at least a first track frame, at least two first wheels and a first track belt looped around said first wheels, and the second track assembly including at least a second track frame, at least two second wheels and a second track belt looped around the second wheels, wherein the first and second track assemblies are laterally spaced apart; and
a track support beam coupled to the first track frame of the first track assembly and the second track frame of the second track assembly and including a first end and a second end, wherein the first end is pivotably coupled to the front crossbeam and the second end is pivotably coupled to the rear crossbeam such that said track support beam pivots about a first axis of rotation and causes the first track assembly to move in the opposite direction of the second track assembly,
wherein the first track assembly is pivotably coupled to the track support beam such that the first track assembly is pivotable about a second axis of rotation approximately perpendicular to the first axis of rotation and the second track assembly is pivotably coupled to the track support beam such that the second track assembly is pivotable about third axis of rotation approximately perpendicular to the first axis of rotation.

11. The track system of claim 10, wherein the first track assembly includes a first track pivot coupling and the first track assembly is pivotably coupled to the track support beam via the first track pivot coupling such that it is pivotable about the second axis of rotation, and the second track assembly includes a second track pivot coupling and the second track assembly is pivotably coupled to the track support beam via the second track pivot coupling such that it is pivotable about the third axis of rotation.

12. The track assembly of claim 10, wherein the second axis or rotation and the third axis of rotation are the same.

13. The track assembly of claim 10, wherein the track support beam of the first dual track propulsion system pivots independently of the track support beam of the second dual track propulsion system.

14. The track assembly of claim 10, wherein the first track assembly pivots about the second pivot axis and the second track assembly pivots about the third pivot axis independent of each other.

15. The track assembly of claim 10, wherein the track support beam is positioned between the first track assembly and the second track assembly.

16. The track assembly of claim 10, wherein the second axis of rotation and the third axis of rotation are located between the track wheels.

17. The track assembly of claim 16, wherein the second axis of rotation and the third axis of rotation extend through a center of the first and second track frames.

18. A farm implement comprising:
an undercarriage including a front crossbeam and a rear crossbeam,
first and second dual track propulsion systems including:
a first track assembly and a second track assembly, each track assembly including at least a track frame, at least two wheels and a track belt looped around said wheels; and
a track support beam coupled to the track frame of the first track assembly and the track frame of the second track assembly and including a first end and a second end, wherein the first end is pivotably coupled to the front crossbeam and the second end is pivotably coupled to the rear crossbeam such that said track support beam pivots about a first axis of rotation and causes the first track assembly to move in the opposite direction of the second track assembly,
wherein the first track assembly is pivotably coupled to the track support beam such that the first track assembly is pivotable about a second axis of rotation approximately perpendicular to the first axis of rotation and the second track assembly is pivotably coupled to the track support beam such that the second track assembly is pivotable about third axis of rotation approximately perpendicular to the first axis of rotation, and wherein at least one of the first track assembly and the second track assembly is positioned between the front crossbeam and the rear crossbeam.

\* \* \* \* \*

UNITED STATES PATENT AND TRADEMARK OFFICE
CERTIFICATE OF CORRECTION

PATENT NO. : 9,457,850 B2  
APPLICATION NO. : 14/306007  
DATED : October 4, 2016  
INVENTOR(S) : Michael D. Van Mill Page 1 of 1

It is certified that error appears in the above-identified patent and that said Letters Patent is hereby corrected as shown below:

In the Claims

Claim 3, Column 4, Line 66 and 67 change "axis or rotation" to --axis of rotation--.

Claim 12, Column 6, Line 23 change "axis or rotation" to --axis of rotation--.

Signed and Sealed this  
Fifteenth Day of October, 2019

Andrei Iancu  
*Director of the United States Patent and Trademark Office*